No. 680,496. Patented Aug. 13, 1901.
W. C. MILLS.
COTTON SEED PLANTER.
(Application filed Feb. 25, 1901.)
(No Model.) 2 Sheets—Sheet 1.

Witnesses
E. A. Ryan

Inventor
W. C. Mills
Attorneys

THE NORRIS PETERS CO., PHOTO-LITHO., WASHINGTON, D. C.

No. 680,496. Patented Aug. 13, 1901.
W. C. MILLS.
COTTON SEED PLANTER.
(Application filed Feb. 25, 1901.)
(No Model.) 2 Sheets—Sheet 2.

Witnesses
E. H. Ryan.
J. S. Chandler.

Inventor
W. C. Mills.
By Chandler & Chandler
Attorneys

UNITED STATES PATENT OFFICE.

WILLIAM CAIRILL MILLS, OF ROWLETT, TEXAS.

COTTON-SEED PLANTER.

SPECIFICATION forming part of Letters Patent No. 680,496, dated August 13, 1901.

Application filed February 25, 1901. Serial No. 48,718. (No model.)

*To all whom it may concern:*

Be it known that I, WILLIAM CAIRILL MILLS, a citizen of the United States, residing at Rowlett, in the county of Dallas, State of Texas, have invented certain new and useful Improvements in Cotton-Seed Planters; and I do hereby declare the following to be a full, clear, and exact description of the invention, such as will enable others skilled in the art to which it appertains to make and use the same.

This invention relates to planters in general, and more particularly to that class designed for the planting of cotton-seed, although it will be understood from the following description that the construction may be used for planting of other seeds.

The object of the invention is to provide a simple, cheap, and efficient construction wherein the seeds will be fed evenly.

Further objects and advantages of the invention will be evident from the following description.

Figure 1:
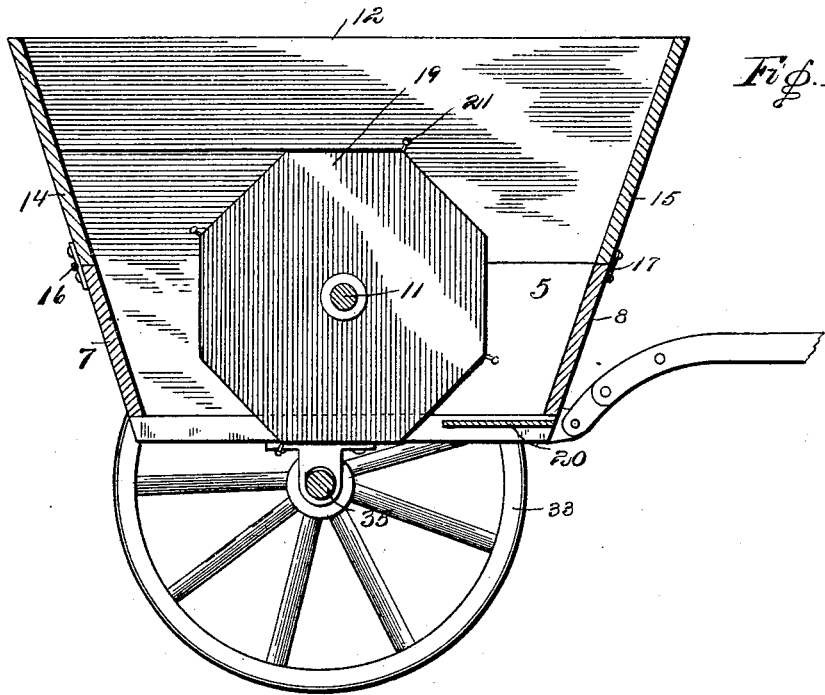
Figure 2:
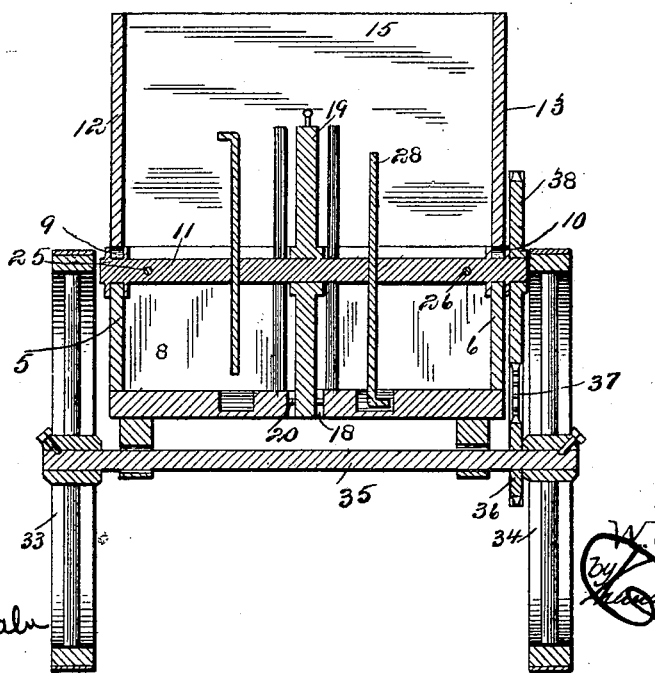
Figure 3:
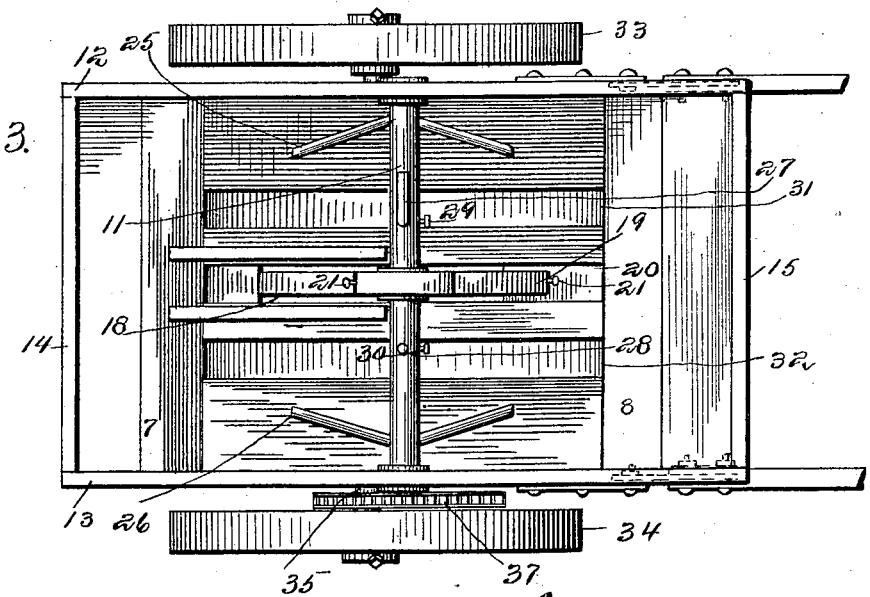
Figure 4:
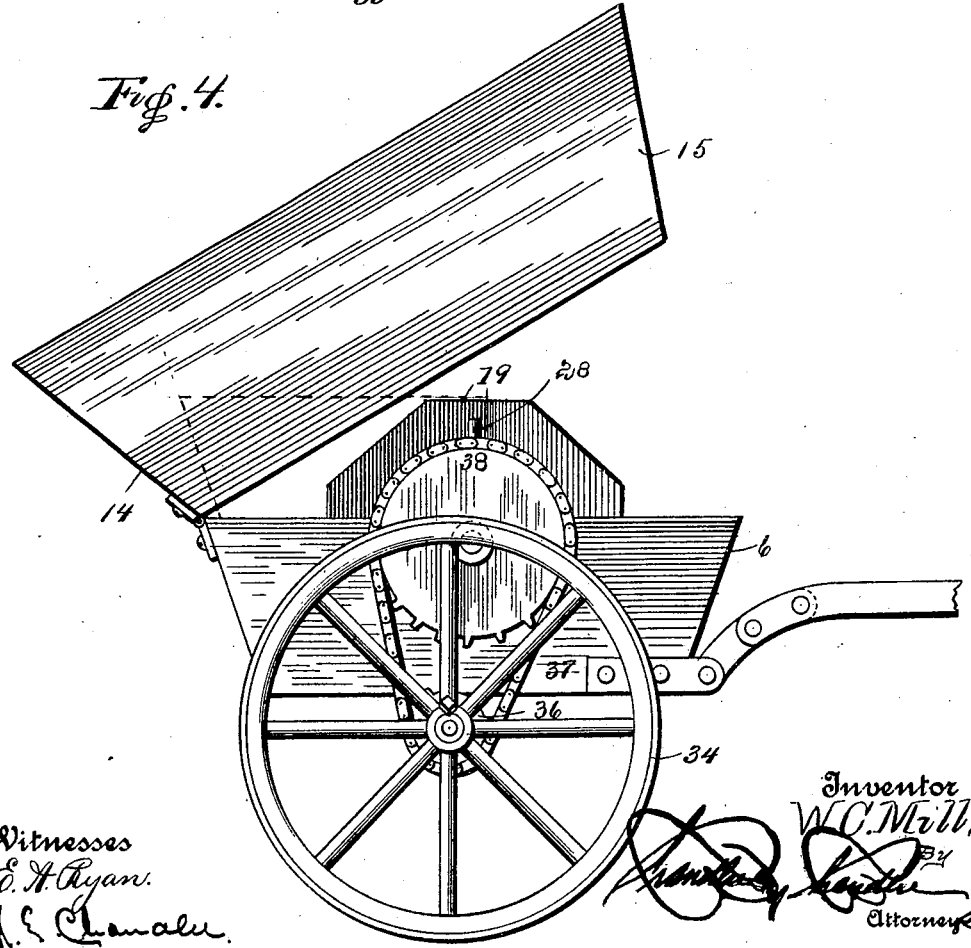

In the drawings forming a portion of this specification, and in which like numerals of reference indicate similar parts in the several views, Figure 1 is a vertical longitudinal section of the planter. Fig. 2 is a transverse section through the planter. Fig. 3 is a top plan view of the planter. Fig. 4 is a side elevation of the planter with the upper portion raised.

Referring now to the drawings, the present planter comprises a hopper including a bottom portion having sides 5 and 6 and ends 7 and 8, the ends converging downwardly, and in the upper edges of the sides are formed bearings 9 and 10 for the operating-shaft 11, which is disposed transversely of the hopper. The hopper includes also an upper portion comprising sides 12 and 13 and downwardly-converging ends 14 and 15, these sides and ends being adapted to rest with their lower edges upon the upper edges of the corresponding portions of the bottom section of the hopper, the upper section being hinged to the bottom section through the medium of hinges 16 at one end. To place the operating-shaft, the upper section of the hopper is raised, and after the shaft has been placed the upper section is again lowered and secured by means of a latch 17. The lower section of the hopper has a central longitudinal slot 18 therethrough, and in this slot is disposed the lower edge of an octagonal feed-wheel 19, which is fixed upon the operating-shaft for rotation thereby. The cotton-seed, which is placed loosely within the hopper, is fed therefrom through this slot at one side of the wheel—that is, at the forward end of the slot—and this forward end of the slot is normally closed by means of a spring-tongue 20, which is attached at the forward end of the slot, while the rear end thereof is free and is disposed in the path of movement of the corners of the feed-wheel, whereby when the wheel is rotated these corners will successively engage the tongue and will depress it, so that the seed may pass therefrom and drop to the furrow. To facilitate discharge of the seed from the tongue, the angles of the wheel are provided with radiating pins 21, which strike and scrape longitudinally of the tongue.

In order that the seed within the hopper may be thoroughly agitated and moved in the direction of the discharge-slot, two sets of agitators are provided. One set consists of two rods 25 and 26, which are passed radially through the shaft at points adjacent to the sides of the hopper and the end portions of which are bent away from the sides of the hopper. The second pair of agitators consists of two wires or rods 27 and 28, which are passed through the operating-shaft adjacent to the feed-wheel and at opposite sides thereof, and which latter are held adjustably by means of set-screws 29 and 30. One end of each of the rods 27 and 28 is bent laterally, and these laterally-bent ends are adapted for movement through grooves 31 and 32, formed longitudinally of the bottom of the hopper. By this means as the shaft rotates the contents of the hopper are continually stirred, with the result of securing a continuous supply of seed from the hopper to the discharge-slot.

The hopper is mounted upon running-gear, including traction-wheels or ground-wheels 33 and 34, which are fixed to their axle 35, and this axle is provided with a sprocket-wheel 36, with which is engaged a sprocket-chain 37, engaged also with a sprocket 38 on the operating-shaft, whereby said shaft is rotated as the planter is moved. With this construction it will be seen that when the upper section of the hopper is raised the feed-shaft, with its feed and agitating mechanism, may be raised bodily from the hopper and may be replaced at will.

What is claimed is—

1. A planter comprising a hopper including a lower section provided with bearings at its upper edge, an upper section hinged to the lower section and adapted to close the bearings, the lower section having a central longitudinal slot and grooves at the sides thereof, and a feed-wheel having a shaft mounted in said bearings and provided with agitating-arms passed radially therethrough, certain of the arms having laterally-bent ends disposed for movement through the grooves, and the remaining agitating-arms being each bent within the shaft to form two members lying at an angle to each other and diverging in the direction of the feed-wheel.

2. A planter comprising a hopper having supporting-wheels and an axle rotatable therewith, said hopper including upper and lower hinged sections, the lower section having bearings in its upper edge adapted to be covered by the upper hopper-section, said hopper having a central longitudinal slot provided with a spring-tongue at one end and longitudinal grooves at the sides of the slot, a shaft removably mounted in the bearings, an angular feed-wheel fixed upon the shaft and disposed in the slot to engage and depress the tongue with its corner portions, agitating-arms engaged with the shaft, and additional agitating-arms engaged with the shaft and disposed to pass with their ends through the grooves, and connections between the shaft and axle for rotating the shaft.

In testimony whereof I hereunto sign my name, in the presence of two subscribing witnesses, on the 23d day of January, 1901.

WILLIAM CAIRILL MILLS.

Witnesses:
JAMES T. HAYS,
G. W. CROSSMAN.